United States Patent [19]
Baker et al.

[11] Patent Number: 5,965,483
[45] Date of Patent: Oct. 12, 1999

[54] HIGHLY MICROPOROUS CARBONS AND PROCESS OF MANUFACTURE

[75] Inventors: Frederick S. Baker, Wando, S.C.; Robert K. Beckler, Lexington, Va.; James R. Miller; Zhiquan Quentin Yan, both of Mt. Pleasant, S.C.

[73] Assignee: Westvaco Corporation, New York, N.Y.

[21] Appl. No.: 08/324,837

[22] Filed: Oct. 20, 1994

Related U.S. Application Data

[63] Continuation-in-part of application No. 08/143,551, Oct. 25, 1993, Pat. No. 5,416,056.

[51] Int. Cl.[6] .................................................. B01J 20/02
[52] U.S. Cl. ........................... 502/425; 502/426; 502/427
[58] Field of Search ................................. 502/425, 426, 502/427

[56] References Cited

U.S. PATENT DOCUMENTS

| | | | |
|---|---|---|---|
| 4,039,473 | 8/1977 | Schafer | 502/427 |
| 5,064,805 | 11/1991 | Otowa | 502/437 |
| 5,162,286 | 11/1992 | MacDowall | 502/437 |
| 5,416,056 | 5/1995 | Baker | 502/425 |

*Primary Examiner*—Mark L. Bell
*Assistant Examiner*—Patricia L. Hailey
*Attorney, Agent, or Firm*—Terry B. McDaniel; Daniel B. Reece, IV; Richard L. Schmalz

[57] ABSTRACT

A process for further chemical activation of activated carbon is disclosed comprising activation of an active carbon precursor material with a potassium hydroxide solution, pre-drying the blend to 5% to 15% moisture content, activating this blend at from about 650° to about 1100° C., and acid washing and drying the microporous activated carbon product, which is characterized by greater than 50% of its total pore volume comprising pores of from about 8Å to 20Å in width and greater than 70% of its total pore volume comprising pores of less than 20Å in width and greater than 95% of its total pore volume comprising pores of less than 50Å in width.

7 Claims, No Drawings

HIGHLY MICROPOROUS CARBONS AND PROCESS OF MANUFACTURE

This application is a continuation-in-part of U.S. patent application Ser. No. 08/143,551, filed Oct. 25, 1993, now U.S. Pat. No. 5,416,056.

BACKGROUND OF THE INVENTION

(1) Field of the Invention

The present invention is directed to the improved production of activated carbon. More particularly, it is directed to the production of highly microporous activated carbon. Specifically, the present invention is directed to the production of highly microporous activated carbon from an activated carbon precursor by a subsequent chemical activation process employing potassium hydroxide. One use of such activated carbon is in the adsorption of gaseous hydrocarbon fuels, including natural gas.

(2) Description of the Prior Art

Practical storage of gaseous hydrocarbon fuels, such as natural gas which is comprised primarily of methane, for such uses as a vehicle fuel and the like involves portable containerization of the gas. Natural gas, in particular, is a leading contender for use as an alternative fuel for automobiles, particularly in areas designated as "zero emission" zones under the 1990 Clean Air Act. The majority of natural gas vehicles operating in the United States use compressed natural gas at pressures of up to 3600 psi. However, low pressure storage systems are being developed in which natural gas is contained in storage containers packed with adsorbent material to achieve near-liquid methane density. The storage containers may be formable or nonformable tanks, cylinders, or other closed vessels. Economic evaluations by the natural gas industry indicate that adsorbed natural gas (ANG) would be comparable economically with compressed natural gas (CNG) at a deliverable gas capacity of 150 volumes of gas per container (cylinder) volume (v/v) at a storage pressure of 500 psi (measured at 25° C.).

Natural gas, which is primarily methane, is adsorbed in pores and on surfaces of the adsorbent medium. Under such conditions, the adsorbed gas assumes properties not unlike those of its liquid state. Typical adsorbents are solids with pores and fissures throughout their structure. Methane molecules preferentially adsorb in pores having a diameter of about 10–15 Angstroms (Å). The carbon material of the present invention may also be suitable for storage of other gases of a similar molecular size.

Active carbon long has been used for removal of impurities and recovery of useful substances from liquids and gases because of its high adsorptive capacity. Generally, "activation" refers to any of the various processes by which the pore structure is enhanced. Typical commercial activated carbon products exhibit a surface area (as measured by nitrogen adsorption as used in the B.E.T. model) of at least 300 m$^2$/g. For the purposes of this disclosure, the terms "active carbon" and "activated carbon" are used interchangeably. Typical activation processes involve treatment of carbon sources—such as resin wastes, coal, coal coke, petroleum coke, lignites, polymeric materials, and lignocellulosic materials including pulp and paper, residues from pulp production, wood (like wood chips, sawdust, and wood flour), nut shell (like almond shell and coconut shell), kernel, and fruit pits (like olive and cherry stones)—either thermally (with an oxidizing gas) or chemically (usually with phosphoric acid or metal salts). Such activated carbons maintain the original macrostructure of the starting material and, therefore, a similar pore distribution of micropores of less than 20Å in width, mesopores of 20Å (divided between small mesopores of 20Å to less than 50Å in width and large mesopores of 50Å to 500Å in width), and macropores of greater than 500Å in width.

As the surface area of an active carbon is directly proportional to the carbon's microporosity and since the methane adsorption capacity of an active carbon is enhanced by increasing its volume of micropores (less than 20Å in width) and small mesopores (20–50Å in width), as a percentage of total pore volume, activation methods are sought which are pore size specific. In particular, micropores in the range of from above 8Å to about 20Å are suitable for adsorption of methane. More particularly, pore sizes of from about 10Å to about 20Å in width are preferred for methane adsorption. Most preferred are pore sizes of from about 10Å to about 15Å. Therefore, carbon materials are desirable which are comprised of a high volume (e.g., greater than 50%) of pores less than 16Å in width as a percentage of total pore volume. Such materials which are comprised of a higher volume (e.g., greater than 80%) of pores less than 20Å in width as a percentage of total pore volume also are desirable. Also desirable are such materials comprised of an extremely high volume (e.g., greater than 95%) of pores less than 50Å in width as a percentage of total pore volume.

Citing disclosures of potassium hydroxide (KOH) activation of coal in U.S. Pat. Nos. 3,764,561 and 4,082,694, the patentees of U.S. Pat. No. 4,769,359 teach the production of active carbon which enables high adsorption of gases per unit volume by treating coal with a liquid mixture comprising KOH and sodium hydroxide (NaOH) and subsequently carbonizing at 500°–800° C. A method of producing activated carbon with a large surface area and a low sulfur content also is taught in U.S. Pat. No. 5,064,805 by mixing coconut shell char with melted potassium hydroxide hydrate at a temperature sufficiently high to cause activation. Also, U.S. Pat. No. 4,082,694 teaches solid KOH activation of specific carbonaceous feeds including coal, coal coke, and petroleum coke to produce cage-like microporous structures particularly useful for water purification.

Chemical activation of wood-based carbon with phosphoric acid ($H_3PO_4$) is disclosed in US. Pat. No. Re. 31,093 to improve the carbon's decolorizing and gas adsorbing abilities. Also, U.S. Pat. No. 5,162,286 teaches phosphoric acid activation of wood-based material which is particularly dense and which contains a relatively high (30%) lignin content, such as nut shell, fruit stone, and kernel. Zinc chloride ($ZnCl_2$) also is a common chemical activation agent. Phosphoric acid activation of lignocellulose material also is taught in U.S. Pat. No. 5,204,310 as a step in preparing carbons of high activity and high density.

Also, U.S. Pat. No. 4,769,359 teaches producing active carbon by treating coal cokes and chars, brown coals or lignites with a mixture of NaOH and KOH and heating to at least 500° C. in and inert atmosphere. U.S Pat. No. 5,102,855 discloses making high surface area activated carbon by treating newspapers and cotton linters with phosphoric acid or ammonium phosphate. Coal-type pitch is used as a precursor to prepare active carbon by treating with NaOH and/or KOH in U.S. Pat. No. 5,143,889. Finally, U.S. Pat. No. 5,292,706 teaches storing natural gas under pressures of 1400 to 4500 kPa using a carbon sieve adsorbent made by impregnating a polymer precursor of the carbon molecular sieve with additional monomers and polymerizing the monomers before carbonizing the precursor.

None of these activated carbons, however, achieve the desired objective of providing 150 v/v of deliverable gas capacity at 500 psi. Such a carbon is taught, in U.S. patent application Ser. No. 08/143,551, (U.S. Pat. No. 5,416,056) to be produced by a two-step chemical activation process. A lignocellulosic material was first activated with phosphoric acid and then activated with potassium hydroxide under thermal conditions. While permitting small scale, laboratory production of the desired carbon material, the disclosed process has several disadvantages which preclude commercial production to avail the product to public use. The large volume of wet carbon material, upon blending with activating agent solution, presents material handling problems. Also, the batch nature of the process, combined with the requirement of a relatively long duration of thermal treatment with gradual incremental temperature increases, precludes efficient, economical production rates. In addition, it was discovered that the disclosed process leaves residual potassium which, along with calcium adsorbed from the wash water, adversely impacted the highly microporous carbon's performance.

Therefore, the objective of this invention is to provide an improved process for manufacturing a highly microporous activated carbon capable of meeting the industry target for a deliverable capacity of a gaseous hydrocarbon fuel stored on activated carbon. It is also an objective of this invention to provide a highly microporous active carbon material that is specific for storage of methane in natural gas to provide a deliverable capacity of 150 v/v of the methane at 500 psi (at 25° C.). It is a further objective of this invention to provide a method for storing natural gas at low pressure using the highly microporous activated carbon.

SUMMARY OF THE INVENTION

The objectives of this invention are accomplished by an improved process whereby highly microporous activated carbon products are produced by activation of an already activated carbon with KOH. The KOH activation comprises blending the active carbon material with a potassium hydroxide solution, pre-drying to reduce the blend to below about 25% moisture content, activating this blend at from about 650° to about 1100° C., and acid washing and drying the microporous activated carbon. The micropore volume and pore size distribution of the activated carbon so obtained are such that the products are useful for adsorbed natural gas storage. Additionally, the adsorption properties of the activated carbon according to the present invention permit its use in applications such as fractionation of hydrocarbons, purification of industrial gases, anti-pollution devices, liquid-phase purification processes in food and chemical industries, water treatment, liquid-phase recovery and separation, catalysts or catalyst supports, batteries, analysis, and medicinal uses, among others.

DETAILED DESCRIPTION OF THE PREFERRED EMBODIMENT(S)

Phosphoric acid is a popular chemical activation/carbonization agent, but at temperatures above about 300° C. polymerization of the acid creates wide pores that are not useful for methane adsorption. Other chemical activation agents, such as zinc chloride, do not produce pores of the size particularly favorable for methane adsorption. It is known from the prior art that initial activation of carbonaceous precursors with alkali appears to produce micropores of the pore size hypothesized as being favorable for methane adsorption, i.e., about 11–12Å width, but necessary pore volume is not produced and product yield is often inadequate. The benefit of employing alkali as a subsequent activation agent is to exploit the merits of different activation agents, while eliminating adverse effects. In the two-stage $H_3PO_4$/KOH activation process disclosed in Ser. No. 143,551, (U.S. Pat. No. 5,416,056) wood is blended with phosphoric acid (1st stage) at an acid to wood ratio of from about 0.5:1 to about 3:1, preferably from about 1:1 to about 2:1. Next, the blend is heated at carbonization temperatures, and the acid is removed from the system. The activated product of the first stage then is chemically activated further by blending with potassium hydroxide at a KOH to char ratio of about 0.5:1 to 4:1, preferably about 1:1 to 2.5:1, at higher temperatures (2nd stage) to yield a product suitable for natural gas storage. The first stage carbonization temperature is from about 150° to about 590° C., and the second stage higher activation temperature is from about 650° to about 980° C. After cooling, the highly microporous active carbon is washed with water to remove residual potassium from the carbon and dried. Experience with the parent application process has proved that removing potassium from the small pores of the carbon to a residual level of below 1 wt% was very time consuming when using only water. It has been discovered that by incorporating an acid wash step, followed by a pH adjustment step (if necessary for specific product end uses), the total wash time was reduced significantly, while obtaining less than 0.1 wt% residual potassium. Other improvements also have been discovered which form the present invention.

The disclosure of the parent application is incorporated by reference herein.

Significantly, the improved process of the present invention differs from that disclosed in the parent application in that the activated carbon precursor material for KOH activation does not have to have been activated by phosphoric acid. In fact, the activated precursor can be the product of another chemical activation agent or the product of thermal or other activation process. Also, the improved process of the present invention differs from that disclosed in the '551 parent application in that the activated carbon is not restricted to lignocellulosic material and the second stage activation agent can be selected from alkalies in general. For the purposes of the present disclosure, the term "alkali" refers broadly to the hydroxides and carbonates of alkali metals and alkaline earth metals, as well a the bicarbonate and hydroxide of the radical ammonium and combinations thereof, but preferably the hydroxides and carbonates of sodium and potassium and combinations thereof. The activated precursor material for the alkali activation may also be derived from other than lignocellulosic material, as noted in an example below.

Nevertheless, the most preferred precursor for the invention process is a wood-based activated carbon such as Westvaco's commercial product, WV-A 1100, which is a product with a pore size distribution tailored to the capture of evaporative gasoline emissions and produced under $H_3PO_4$ activation.

Alternatively, other examples of activated carbonaceous material suitable for subsequent alkali activation according to the invention are the high butane working capacity (BWC) carbons (and methods of their preparation) reported in U.S. Pat. Nos.: 5,204,310; 5,206,207; 5,238,470; and 5,250,491, the disclosures of which are incorporated herein by reference. Basically, the invention includes a subsequent alkali activation of activated carbon materials.

ALKALI ACTIVATION

In addition to a broader range of precursor materials and activants, a most significant improvement over the KOH activation step disclosed in Ser. No. 551 is the provision of continual material throughput with a short residence time over the previous time consuming batch thermal activation stage. A granular WV-A 1100 product is blended with a solution of alkali at a alkali/activated carbon ratio of 0.5:1–5:1 (dry weight basis). The wet blend material is pre-dried in conventional drying equipment such as a tray drier, a fluidized bed dryer, a rotary kiln drier, or a blender drier. Drying is effected in a hot gas atmosphere and preferably in a hot inert atmosphere.

The pre-dried, moist carbon (preferably, ~10% moisture content) is activated in a continuous rotary kiln comprising a heated section and a cooling section. The heated section is designed to raise the carbon temperature to from about 650–1100° C. for from 5–40 minutes, preferably 8–15 minutes. The cooling section, preferably with a $N_2$ purge, permits reducing the activated carbon temperature prior to washing.

The cooled activated char, which is alkaline, is washed first with water to reduce the potassium level, after which the active carbon material is washed with acid water of a pH of 1.5–5.0 to reduce the potassium level to less than 0.5%, preferably less than 0.2%, and most preferably less than 0.1%. The acid wash is followed by a neutralization cycle with NaOH to bring the pH of the carbon/water suspension up to a pH of 3.0–7.5, preferably 6.5. Finally, a neutral water wash is employed to rinse the carbon.

After the rinsed carbon is allowed to drain, it is dried. A multi-shelf cart oven may be employed for drying. More detailed embodiments of the invention process are set forth in the following examples.

EXAMPLE 1

A product of the first stage-phosphoric acid activation, or granular, 10×25 mesh WV-A 1100 product, was treated as stated above. It was blended with a KOH solution at a KOH/C ratio of 1.8:1 (dry basis) in a fluidizing blender/dryer and dried for 28 minutes (to achieve the target moisture of 10%, wet basis). Because the dried blend was less tacky (versus the process without pre-drying), material yield across this process step increased from 82 to 98% (db), and the earlier need to wash out the blender between batches was eliminated.

Thermal treatment of the pre-dried KOH/C blend was carried out under a nitrogen atmosphere in an indirect-fired, continuous pilot rotary kiln. Firing of the kiln was maintained throughout the production run, and feed was continuous with only two interruptions. Kiln rotational speed was 1.2 rpm, resulting in a residence time of 10 minutes. The nominal feed rate of dried, alkaline blend was 60 lb/hour. Largely because of limitations on control of feed screw speed, production rate of (activated) alkaline char varied between about 36 and 46 lb/hour and averaged 43 lb/hour (db). A total of 6000 lb (db) of KOH/C blend was fed to the activation kiln.

The washing procedure, which extracted potassium salts from the alkaline char, was carried out in a 220-gallon tank. Each batch of alkaline char (400–500 lb) was washed in about seven hours, which matches activation kiln output at a nominal feed rate of 60 lb/hour. The drying step was carried out as described previously in a convection drying oven. Properties produced by the process are set forth in the following tables. Table I shows surface area and pore size distribution data.

TABLE I

| PRODUCT PROPERTY | SURFACE AREA AND PORE SIZE DISTRIBUTION OF PRODUCT | | | | |
|---|---|---|---|---|---|
| | A | B | C | D | Avg |
| Surface Area ($m^2g^{-1}$) | 2368 | 2372 | 2366 | 2352 | 2365 |
| Pore Volume (cc/g): < 20Å Width | 0.84 | 0.84 | 0.86 | 0.83 | 0.84 |
| < 50Å Width | 1.12 | 1.12 | 1.12 | 1.12 | 1.12 |
| < 1000Å Width | 1.15 | 1.15 | 1.14 | 1.14 | 1.15 |

The BET nitrogen surface areas of the product averaged 2365 $m^2g^{-1}$. Micropore volume for less than 20Å pore widths averaged 0.84 cc/g, as determined using the BJH method of pore size analysis.

Table II describes the methane adsorption properties of the invention example products:

TABLE II

| | METHANE CAPACITY DATA | | | | |
|---|---|---|---|---|---|
| Sample | MWC (v/v) | MTC (v/v) | Me.Act (wt %) | Density (g/cc) | Retentivity (%) |
| E | 154 | 174 | 18.5 | 0.532 | 13 |
| F | 153 | 173 | 18.8 | 0.518 | 13 |
| G | 154 | 174 | 17.8 | 0.553 | 13 |
| H | 153 | 175 | 18.6 | 0.533 | 14 |
| I | 153 | 172 | 18.4 | 0.527 | 12 |
| J | 153 | 174 | 19.1 | 0.512 | 13 |
| K | 151 | 171 | 18.2 | 0.530 | 13 |
| L | 154 | 174 | 18.6 | 0.528 | 13 |
| M | 54 | 174 | 19.3 | 0.505 | 13 |
| N | 155 | 173 | 19.0 | 0.513 | 12 |
| O | 154 | 173 | 19.5 | 0.500 | 13 |
| Average: | 153 | 173 | 18.7 | 0.523 | 13 |

The methane capacity data shown in Table II demonstrate that the invention process can be tightly controlled to produce consistent product. The methane working capacity of the product averaged 153 v/v, meeting the target of 150 v/v. Total capacity averaged 173 v/v; weight activity averaged 18.7 wt%); methane retentivity averaged 13%; and packed density averaged 0.523 g/cc).

Table III shows the trace metals levels of the highly microporous carbon products.

TABLE III

| Sample | TRACE K LEVELS (wt %) K |
|---|---|
| E | 0.01 |
| F | 0.03 |
| G | 0.01 |
| H | 0.01 |
| I | 0.01 |
| J | 0.01 |
| K | 0.01 |
| L | 0.01 |
| M | 0.01 |
| N | 0.01 |
| O | 0.02 |
| Average: | 0.01 |

EXAMPLE 2

To substantiate the resultant pore size re-distribution as a result of invention treatment of the lignocellulosic material, a sample product of the disclosed process was analyzed for pore size distribution by the Density Functional Theory (DFT) using argon adsorption data, a procedure known to those skilled in the art. The results of the analysis are reported in Table IV.

TABLE IV

| Pore Width (Å)* | % of Total (< size) |
|---|---|
| 4.1 | 0.0 |
| 4.4 | 0.7 |
| 5.1 | 10.4 |
| 5.9 | 15.1 |
| 6.8 | 18.6 |
| 8.0 | 27.6 |
| 9.3 | 37.3 |
| 10.0 | 37.8 |
| 10.8 | 43.8 |
| 11.7 | 49.6 |
| 12.7 | 52.6 |
| 13.7 | 56.3 |
| 14.7 | 61.6 |
| 15.9 | 65.7 |
| 17.3 | 71.3 |
| 18.6 | 76.9 |
| 20.1 | 81.9 |
| 21.7 | 86.5 |
| 23.4 | 90.1 |
| 25.2 | 93.0 |
| 29.4 | 96.5 |
| 50.4 | 99.5 |
| 100.5 | 99.8 |
| 1004.0 | 100.0 |

*Determined by BJH method

These data show that greater than 50% of the total pore volume is comprised of pores >8Å to 20Å in width (81.9–27.6). Also, the data show that >80% of the total pore volume is comprised of pores less than 20Å in width. Finally, the data show that >98% of the total pore volume is comprised of pores less than 50Å in width.

EXAMPLE 3

A commercially available coconut-based activated carbon product G210R, was treated as described in the parent application (Ser. No. '551). The granular product was blended with a solution of KOH at a KOH/carbon ratio of 2:1 (dry weight basis). The impregnated carbon was loaded into a stainless steel retort of an indirect-fired rotary kiln. The temperature of the bed was increased from near ambient to 1600° F. over a period of 4 hours. An inert atmosphere in the retort was maintained by a flow of nitrogen gas. The free-flowing, granular product was removed from the kiln, cooled to an ambient temperature, and washed with water at 180° F. The product was dried at 230° F. in a convection oven.

The surface area and pore size distribution data for the precursor activated carbon and the KOH-activated product, respectively, are recorded in Table V. These data demonstrate that both the surface area and the volume of very small pores, i.e., <50Å width, are substantially increased as a result of performing a second stage of activation of the coconut-based activated carbon with KOH.

EXAMPLE 4

A commercially available coal-based activated carbon product, F-400 was activated with KOH in a manner similar to that described above in Example 3.

The surface area and pore size distribution data for the precursor activated carbon and the KOH-activated product, respectively, are recorded in Table V. These data demonstrate that both the surface area and the volume of very small pores, i.e., <50Å width, are substantially increased as a result of performing a second stage of activation of the coal-based activated carbon with KOH.

TABLE V

INFLUENCE OF KOH ACTIVATION ON PORE VOLUME OF COCONUT AND COAL-BASED ACTIVATED CARBON PRODUCTS

| | Coconut Carbon | | Coal Carbon | |
|---|---|---|---|---|
| PRODUCT PROPERTIES | Precursor | Product | Precursor | Product |
| Surface Area ($m^2g^{-1}$) | 1211 | 1974 | 991 | 1528 |
| Pore Volume (cc/g)*: <16Å Width | 0.36 | 0.40 | 0.28 | 0.32 |
| <20Å Width | 0.47 | 0.65 | 0.36 | 0.49 |
| <50Å Width | 0.57 | 0.96 | 0.46 | 0.74 |
| <1000Å Width | 0.59 | 0.98 | 0.59 | 0.87 |

*Determined by BJH method

EXAMPLE 5

A commercially available wood-based activated carbon product, WV-A 1100, was blended with a solution of KOH at a KOH/carbon ratio of 2:1 (dry weight basis). The impregnated carbon was loaded into a stainless steel retort of an indirect-fired rotary kiln. The temperature of the bed was increased from near ambient to 1600° F. over a period of 4 hours and held at 1600° F. for a period of 1 hour. An inert atmosphere in the retort was maintained by a flow of nitrogen gas. The free-flowing, granular product was removed from the kiln, cooled to ambient temperature, and washed with water at 180° F. The product was dried at 230° F. in a convection oven.

The surface area and pore size distribution data for the precursor activated carbon and the KOH-activated product, respectively, are recorded in Table VI. These date demonstrate that the volume of very small pores, i.e., <50Å width, is substantially increased as a result of performing a second stage of activation of the wood-based activated carbon with KOH. In particular, the micropore volume, i.e., <20Å width, is greatly increased by almost 150%.

EXAMPLE 6

A commercially available wood-based activated carbon produce WV-A 1100, was blended with a solution of NaOH at a NaOH/carbon ratio of 2:1 (dry weight basis). The impregnated carbon was loaded into a stainless steel retort of an indirect-fired rotary kiln. The temperature of the bed was increased from near ambient to 1600° F. over a period of 4 hours. An inert atmosphere in the retort was maintained by a flow of nitrogen gas. The free-flowing, granular product was removed from the kiln, cooled to ambient temperature, and washed with water at 180° F. in a convection oven.

The surface area and pore size distribution data for the precursor activated carbon and the NaOH-activated product, respectively, are recorded in Table VI. These data demonstrate that volume of very small pores, i.e., <50Å width, is substantially increased as a result of performing a second stage of activation of the wood-based activated carbon with NaOH.

TABLE VI

INFLUENCE OF KOH AND NaOH ACTIVATION, RESPECTIVELY, ON PORE VOLUME OF WOOD-BASED ACTIVATED CARBON

|  | KOH | | NaOH | |
|---|---|---|---|---|
| PRODUCT PROPERTIES | Precursor | Product | Precursor | Product |
| Surface Area ($m^2g^{-1}$) | 2294 | 2312 | 1556 | 1917 |
| Pore Volume (cc/g)*: <16Å Width | 0.13 | 0.62 | 0.06 | 0.28 |
| <20Å Width | 0.38 | 0.91 | 0.19 | 0.54 |
| <50Å Width | 1.24 | 1.07 | 0.87 | 0.94 |
| <1000Å Width | 1.59 | 1.09 | 1.20 | 0.98 |

*Determined by BJH method

It is noteworthy also that the granular nature of the precursor essentially is preserved by using the process described herein. This is in marked contrast to the KOH activation processes as previously described in reference to U.S. Pat. No. 4,082,694, U.S. Pat. No. 5,064,805, and U.S. Pat. No. 5,143,889 for the KOH-activation of carbonaceous precursors, which produce a low density, small particle size product that is difficult to handle, both during processing and in use.

Subsequent activation with KOH of lignocellulose-base, phosphoric acid carbonized/activated carbons also reduced the total residual phosphate content of the carbons. Although this effect was not surprising, the magnitude of the reduction was startling and, indeed, unexpected. The total residual phosphate content of the carbon was reduced from 5.3% to 0.01%. To place this finding in perspective, the lowest total residual phosphate content previously known to be obtained by washing and thermally post-treating a wood-based carbon was about 0.5%. Bearing in mind that some of the surface oxides of wood-based carbons are associated with the residual phosphate content of the carbon, the surface chemistry of the KOH-activated carbon may be significantly different from that of the lignocellulose-based carbon activated with phosphoric acid alone. For example, the carbon should be more hydrophobic (less polar), which in itself could favor methane adsorptions In summary, subsequent activation of activated an carbon material with KOH at high temperature shifts the pore size distribution of the carbon to a range favorable for methane adsorption. The micropore volume of the carbon is greatly enhanced to a level not previously obtained. In the examples cited here, this generally resulted in a deliverable gas storage capacity of ≧150 v/v at 500 psi. The granular nature of the precursor is retained following activation with KOH.

While the invention has been described and illustrated herein by references to various specific materials, procedures and examples, it is understood that the invention is not restricted to the particular materials, combination of materials, and procedures selected for that purpose. Numerous variations of such details can be employed, as will be appreciated by those skilled in the art.

What is claimed is:

1. A process for the manufacture of highly microporous activated carbon comprising the steps of forming a wet blend of an activated carbon material and an alkali solution at a ratio of from 0.5:1 to 5:1, on a dry weight basis, pre-drying the wet blend to a moisture content of below about 25%, heat treating the blend at from about 650° to about 1100° C., and acid washing and drying the microporous activated carbon product.

2. The process of claim 1 wherein the ratio of alkali solution to activated carbon material in the blend is from 1:1 to 3:1, the alkali solution is selected from the group consisting of potassium hydroxide, sodium hydroxide, potassium carbonate, and sodium carbonate, and the heat treatment is conducted at from about 650° to about 980° C., wherein greater than 50% of the total pore volume of the highly microporous activated carbon is comprised of pores of less than 16Å in width, greater than 70% of the total pore volume of the highly microporous activated carbon is comprised of pores of less than 20Å in width, and greater than 98% of the total pore volume of the highly microporous activated carbon is comprised of pores of less than 50Å in width.

3. The process of claim 2 wherein the activated carbon material is derived from a material selected from the group consisting of coal and lignocellulose material.

4. The process of claim 3 wherein the lignocellulosic material is selected from a member of the group consisting of wood chips, sawdust, wood flour, and coconut shell and the alkali solution is selected from the group consisting of potassium hydroxide and sodium hydroxide.

5. The process of claim 1 wherein the acid washing step includes recovery of alkali from the alkali solution for use in forming the wet blend.

6. The process of claim 4 wherein the alkali solution is potassium hydroxide and greater than 70% of the total pore volume of the highly microporous activated carbon product is comprised of pores of less than 20Å in width and greater than 95% of the total pore volume of the highly microporous activated carbon product is comprised of pores of less than 50Å in width.

7. The process of claim 6 wherein greater than 50% of the total pore volume of the highly microporous activated carbon product is comprised of pores of less than 16Å in width, and greater than 98% of the total pore volume of the highly microporous activated carbon product is comprised of pores of less than 50Å in width.

* * * * *